US012006886B1

(12) United States Patent
Lohrisch et al.

(10) Patent No.: US 12,006,886 B1
(45) Date of Patent: Jun. 11, 2024

(54) SYSTEMS AND METHODS FOR PILOT FUEL SYNTHESIS

(71) Applicant: Caterpillar Inc., Peoria, IL (US)

(72) Inventors: Ian Axel Lohrisch, Fort Collins, CO (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/179,902

(22) Filed: Mar. 7, 2023

(51) Int. Cl.
*F02D 19/06* (2006.01)

(52) U.S. Cl.
CPC ..... *F02D 19/0671* (2013.01); *F02D 19/0647* (2013.01); *F02D 19/0665* (2013.01)

(58) Field of Classification Search
CPC .......................... F02D 19/0647; F02D 19/0671
USPC ...................................................... 123/3, 575
See application file for complete search history.

(56) References Cited

U.S. PATENT DOCUMENTS 5,097,803 A * 3/1992 Galvin ................ F02D 19/0655 123/3
6,205,957 B1 * 3/2001 Saylor ..................... F02B 43/10 123/3
8,820,269 B2 9/2014 Duwig et al.
8,955,468 B2 * 2/2015 Duwig .................... C10L 1/026 123/557
9,109,498 B2 * 8/2015 Bradley ................ F02D 19/081
9,261,053 B2 * 2/2016 Jacob ...................... F02M 26/28
9,624,447 B2 * 4/2017 Doering .................... C10L 1/02
10,590,866 B2 3/2020 Ingemar et al.
11,635,039 B1 * 4/2023 Dou ....................... F02M 27/02 123/294
2013/0255596 A1 * 10/2013 Mingilino ............... C25B 11/00 123/3
2015/0107538 A1 * 4/2015 Sall ....................... F02D 19/084 123/3

FOREIGN PATENT DOCUMENTS

AU 2013248186 A1 11/2013
CN 216111004 U 3/2022
EP 0419743 A1 4/1991
EP 1106803 A2 * 6/2001 ................ F02B 3/08

* cited by examiner

*Primary Examiner* — Erick R Solis
(74) *Attorney, Agent, or Firm* — Lee & Hayes, P.C.

(57) ABSTRACT

An internal combustion engine system is described herein. The system uses reactor to create pilot fuel from the primary fuel to assist in the ignition of the primary fuel. A controller is used to maintain an operational range of a level of the pilot fuel in an accumulator. The accumulator acts as a buffer to allow the engine to continue to receive the pilot fuel during dynamic and changing conditions of the engine. The controller increases or decreases the rate of production of the pilot fuel by a pilot fuel system to maintain the operational range of the level of the pilot fuel in the accumulator. The controller can receive inputs such as pilot fuel level or power signals from the engine to adjust the rate of production of the pilot fuel to meet engine demand.

20 Claims, 4 Drawing Sheets

SYSTEMS AND METHODS FOR PILOT FUEL SYNTHESIS

TECHNICAL FIELD

The present disclosure relates generally to operating a prime mover, and more particularly, to using a primary fuel type to synthesize a pilot fuel.

BACKGROUND

Work machine prime movers, such as internal combustion engines, fuel cells, batteries, and the like, are widely used in various industries. Internal combustion engines, for example, can operate using a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. Further, in pilot-ignited applications, including dual fuel applications, a mixture of a gaseous fuel, such as natural gas and air, is delivered into a cylinder and ignition is triggered using a relatively small direct injection of a compression ignition fuel (e.g., pilot fuel) which autoignites to trigger ignition of the relatively larger main charge.

As part of the effort to improve the efficiency of these engines, researchers have explored various types of alternate fuel mixtures, including alcohol fuels like methanol. In some examples, methanol is directly injected into an engine cylinder and the methanol is ignited with a pilot fuel or a spark. The use of methanol can provide various benefits over other alternate fuel additives. For example, methanol has relatively low production costs and can be less expensive to produce relative to other alternative fuels. Further, the availability of methanol can be greater than other sources of alternate fuel additives because methanol can be produced in a variety of ways using materials ranging from natural gas to coal. Additionally, methanol is relatively safe to use, store, and transport because methanol has a relatively low risk of flammability. As mentioned above, a pilot fuel may be needed to assist in the ignition of the methanol. Diesel fuel is often used as the pilot fuel to ignite the low cetane methanol fuel for methanol powered engines. Typically, diesel fuel, as the pilot fuel, will be injected into a combustion chamber prior to the injection of the methanol fuel. The ignition of the diesel (or pilot fuel) causes the ignition of the methanol fuel.

In some instances, diesel fuel may not be desirable or available. Thus, some efforts have been made to provide a pilot fuel for use in a combustion engine using other types or sources of pilot fuels. For example, European Patent Application No. 419743A1 to Galvin ("the '743 application") describes a system configured to generate dimethyl ether (DME) using methanol stored in a storage tank. The system of the '743 application uses a dehydration reactor to convert the methanol to DME. However, the system described in the '743 application can be limited in its use, as the system does not provide for the storage or use of excess DME production. Further, in some instances in which methanol is used as a primary fuel, in some circumstances, the methanol will need to be purged from the system prior to a shutdown. The system described in the '743 application would be limited in those situations in which a methanol purge is required. Additionally, the pilot fuel generated by the system described in the '743 application may not be available during a startup of the system until the DME production unit comes up to operating temperature after the engine is started and running for some time. As a result of the deficiencies noted above, and others not specified, as a result of the configuration described above, the system described in the '743 may be limited in use because of the lack the ability to store excess DME, provide DME prior to startup, or meet safety requirements if the methanol and/or DME is required to be purged prior to shut down.

Examples of the present disclosure are directed to overcoming deficiencies of such systems.

SUMMARY

In one aspect of the present disclosure, a system includes an internal combustion engine that consumes a primary fuel and a pilot fuel, a primary fuel tank providing the primary fuel to a primary fuel rail for use by the internal combustion engine, a pilot fuel system configured to generate the pilot fuel from the primary fuel, the pilot fuel system including: a pilot fuel pump fluidic ally connected to the primary fuel tank, the pilot fuel pump configured to pump the primary fuel from the primary fuel tank to a reactor of the pilot fuel system, a reactor that receives the primary fuel from the pump, the reactor configured to convert the primary fuel received from the pump from an alcohol to an ether, wherein a product of the reactor comprises the pilot fuel, unreacted primary fuel, and water, a condenser that receives the product of the reactor, the condenser configured to condense the unreacted primary fuel and the water in the product received from the reactor into liquified unreacted primary fuel and water, a separator that receives the liquified unreacted primary fuel and water and pilot fuel, the separator configured to separate the pilot fuel from the liquified unreacted primary fuel and water, a waste pump that receives the liquified unreacted primary fuel and water from the separator, the waste pump configured to pump the liquified unreacted primary fuel and water to the primary fuel rail, a product pump that receives the pilot fuel from the separator, the product pump configured to pump the pilot fuel converted from the primary fuel to an accumulator for use by the internal combustion engine, and a controller to maintain a level of the pilot fuel stored in the accumulator within an operational range, the controller configured to change a speed of the pilot fuel pump to change a rate of production of the pilot fuel.

In another aspect of the present disclosure, a method of operating an internal combustion engine includes receiving, by a controller, a level of a pilot fuel in an accumulator, wherein the pilot fuel consumed by the internal combustion engine is generated by a conversion of a primary fuel consumed by the internal combustion engine into the pilot fuel using a dehydration reaction in a reactor, detecting, by the controller, a condition in which a change in a production rate of the pilot fuel by a pilot fuel system is required, determining, by the controller based on detecting the condition, that the production rate of the pilot fuel is to be, reduced by transmitting a first pump control signal to reduce the speed of a pilot fuel pump from a first pump rate to a second pump rate, wherein the second pump rate is lower than the first pump rate, wherein the pilot fuel pump is fluidically connected to a primary fuel tank storing the primary fuel, the pilot fuel pump configured to pump the primary fuel from the primary fuel tank to the reactor, increased by transmitting a second pump control signal to increase the speed of the pilot fuel pump from the first pump rate to a third pump rate, wherein the third pump rate is higher than the first pump rate, or maintained at the first pump rate.

In a still further aspect of the present disclosure, a pilot fuel system configured to generate a pilot fuel from a primary fuel includes a pilot fuel pump fluidically connected to the primary fuel tank, the pump configured to pump the primary fuel from the primary fuel tank to a reactor of the pilot fuel system, the reactor that receives the primary fuel from the pump, the reactor configured to convert the primary fuel received from the pump from an alcohol to an ether, wherein a product of the reactor comprises the pilot fuel, unreacted primary fuel, and water, a condenser that receives the product of the reactor, the condenser configured to condense the unreacted primary fuel and the water in the product received from the reactor into liquified unreacted primary fuel and water, a separator that receives the liquified unreacted primary fuel and water and pilot fuel, the separator configured to separate the pilot fuel from the liquified unreacted primary fuel and water, a waste pump that receives the liquified unreacted primary fuel and water from the separator, the waste pump configured to pump the liquified unreacted primary fuel and water to the primary fuel rail, a product pump that receives the pilot fuel from the separator, the product pump configured to pump the pilot fuel converted from the primary fuel to an accumulator for use by the internal combustion engine, and a controller to maintain a level of the pilot fuel stored in the accumulator within an operational range, the controller configured to change a speed of the pilot fuel pump to change a rate of production of the pilot fuel.

DETAILED DESCRIPTION

Figure 1:
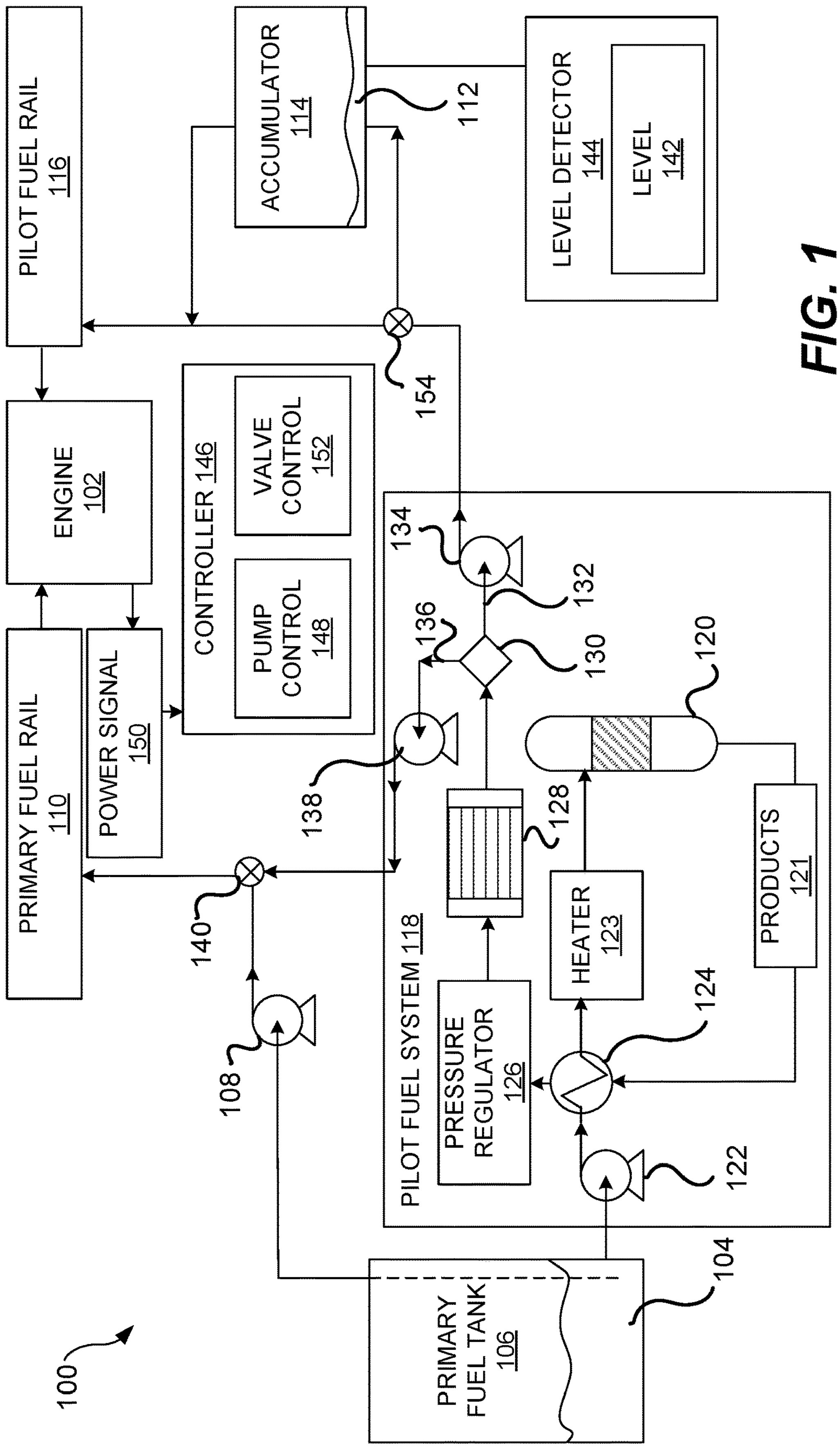
FIG. 1 is a schematic illustration of a system, including an internal combustion engine that creates pilot fuel from a primary fuel, in accordance with one or more examples of the present disclosure.

Wherever possible, the same reference numbers will be used throughout the drawings to refer to same or like parts. Referring to FIG. 1, there is shown a combustion engine system 100 that creates a pilot fuel using a primary fuel as a source for the pilot fuel, in accordance with one or more examples of the present disclosure. The system 100 includes an engine 102. As use herein, the engine 102 is a type of prime mover that may be used separately from, or in conjunction with, other systems such as batteries, fuel cells, and the like. The engine 102 is an internal combustion engine fueled by a primary fuel 104 stored in a primary fuel tank 106. The primary fuel 104 may include an alcohol fuel such as methanol or ethanol, for example, or other fuel types (e.g., diesel fuel, gasoline, liquid natural gas, etc.). For the purposes of illustrating an example of the presently disclosed subject matter, the primary fuel 104 is methanol. The primary fuel 104 is pumped by a primary fuel pump 108 into a primary fuel rail 110 for use by the engine 102. As used herein, a "rail" is a fuel line that supplies fuel to injectors (not shown) of the engine 102. It should be noted that the presently disclosed subject matter is not limited to the use of fuel rails.

In some examples, the primary fuel 104 is a relatively lower cetane/higher octane type of fuel that, in the configuration illustrated in FIG. 1, uses a pilot fuel, such as the pilot fuel 112 stored in an accumulator 114 and provided through a pilot fuel rail 116, to cause the ignition of the primary fuel 104. The pilot fuel 112 may include a higher cetane/lower octane liquid fuel, and the primary fuel 104 may include a lower cetane/higher octane liquid fuel. The terms "higher" and "lower" in this context may be understood as relative terms in relation to one another. Thus, the pilot fuel 112 may have a higher cetane number and a lower octane number than a cetane number and an octane number of the primary fuel 104.

In the system 100 of FIG. 1, the pilot fuel 112 is produced from the primary fuel 104 using pilot fuel system 118. Thus, while the primary fuel tank 106 is stores the primary fuel 104 for use by the engine 102, the primary fuel tank 106 also stores fuel to produce the pilot fuel 112 used by the engine 102. To produce the pilot fuel 112 in the example of FIG. 1, the primary fuel 104 undergoes a dehydration reaction in the reactor 120 according to the following chemical reaction (1):

$$2CH3OH \leftrightarrow CH3OCH3+H2O; \quad (1)$$

where 2CH3OH is methanol, CH3OCH3 is dimethyl ether (DME), and H2O is water. The reactor 120 can be various types of reactors, having various types of catalysts, capable of dehydrating the methanol to DME. Some catalysts include, but are not limited to, aluminum oxide, titanium oxide, and barium oxide. The reaction temperature within the reactor 120 can vary depending on flowrate and the catalyst used, with temperatures ranging from 200° C. to 400° C. Because the dehydration reaction provided above is an exothermic equilibrium equation, it follows that from a thermodynamic point of view high degrees of conversion are achieved at reaction temperatures as low as possible. However, a minimal temperature is typically needed from a reaction-kinetic point of view in order to ensure sufficient reaction rates and thus acceptable DME conversion rates. To increase the temperature of the incoming primary fuel 104, a heater 123 may be used for heating the incoming primary fuel 104 to a desired temperature. However, if the temperature of the incoming primary fuel 104 is sufficient, the heater 123 may not be used or installed.

Pilot fuel pump 122 pumps a portion of the primary fuel 104 into the pilot fuel system 118. The pilot fuel pump 122 pumps the primary fuel 104 through a recuperator 124, the use of which is explained in more detail below. The primary fuel 104 leaves the recuperator 124 and flows through the heater 123 (if used) where the primary fuel 104 is reacted in the reactor 120 to form the pilot fuel 112, in this example DME. The output of the reactor 120 includes the pilot fuel 112, the water, and unreacted primary fuel 104. The output of the reactor 120 flows through the recuperator 124. As mentioned above, the pilot fuel system 118 uses a recuperator 124. The recuperator 124 is a heat exchanger that provides for the exchange of heat between the relatively higher temperature products 121 of the reactor 120 with the relatively lower temperature primary fuel 104. Thus, while the temperature of the primary fuel 104 is increased, the temperature of the products 121 is reduced.

The products 121, which include the DME, water, and unreacted methanol, exit the recuperator 124 and enter a pressure regulator 126. The pressure regulator 126 lowers the pressure of the products 121 to liquify at least a portion of the methanol and water in the products 121. Liquifying the methanol and water help to separate the methanol and water from the DME to increase the purity of the pilot fuel 112. The products 121 thereafter enter condenser 128 to reduce the temperature (and in some examples, the pressure) of the products 121. The condenser 128 can be various types of heat exchangers designed to reduce the temperature of the products 121 including, but not limited to a, shell and tube heat exchanger, tube in tube heat exchanger, direct or indirect heat exchanger, or phase change heat exchanger. It should be noted that in some examples, the methanol and water are liquified primarily in, or exclusively in, the condenser 128. Thus, in these examples, the pressure regulator 126 may not be used or installed.

After the condenser 128, the products 121 are primarily methanol and water in liquid form and DME in gaseous form. The products 121 leave the condenser 128 and enter the separator 130. The separator 130 has therein a volume that allows the gaseous DME (as the pilot fuel 112) to collect in one, upper part of the volume while the liquified methanol and water occupy the lower part of the separator 130. The gaseous DME 132 is pumped to the accumulator 114 using product pump 134. The product pump 134 increases the pressure of the DME to condense the vapor DME to liquid DME for storage within the accumulator 114. In some examples, the liquid methanol/water stream 136 can be considered a waste product. However, to reuse the unreacted methanol in the methanol/water stream 136, the methanol/water stream 136 is pumped into the primary fuel rail 110 using the waste pump 138 through a mixer 140. The mixer 140 provides for the introduction of the methanol/water stream 136 into the primary fuel 104 being pumped by the primary fuel pump 108 into the primary fuel rail 110.

During use, the accumulator 114 acts as a buffer or "make-up" tank that allows for a consistent flow of the pilot fuel 112 into the pilot fuel rail 116. For example, the engine 102 may have a sudden increase in power demand whereby additional primary fuel 104 and pilot fuel 112 are needed to supply the increased demand from the engine 102. In a similar manner, the engine 102 may have a sudden decrease in power demand, whereby less primary fuel 104 and pilot fuel 112 are needed to supply the lower demand from the engine 102. However, the pilot fuel system 118 may not be capable of an instantaneous or rapid increase or decrease of production of the pilot fuel 112. Thus, in order to maintain a desired combustion mixture ratio of the primary fuel 104 and the pilot fuel 112 at the higher or lower power level, additional pilot fuel 112 may be received from the accumulator 114. During this power demand cycle, the pilot fuel system 118 increases or decreases production, described in more detail in FIG. 3, below.

The pilot fuel 112 in the accumulator 114 may also be needed during a startup phase of the engine 102. While starting up the engine 102, the pilot fuel system 118 may be at reduced temperature whereby the efficiency of the reaction within the reactor 120 is insufficient to produce the pilot fuel 112. Thus, as in the situation in which an instant increase in power required by the engine 102 is met using the pilot fuel 112 in the accumulator 114, the pilot fuel 112 stored in the accumulator 114 prior to shutdown of the engine 102 can be used while the pilot fuel system 118 increases to a desired operational temperature. Further, the pilot fuel 112 in the accumulator 114 may be used during a shutdown of the engine 102. In some examples, the primary fuel 104 may need to be fully evacuated from the engine 102 prior to shut down. In some examples, during shutdown, the pilot fuel 112 may be used in lieu of the primary fuel 104 so that, at full shutdown, there is no remaining primary fuel 104. The evacuation process may be assisted using high pressure nitrogen or inert gas (not shown).

Thus, the level of the pilot fuel 112 in the accumulator 114 can be used to allow for transient events such as, but not limited to, an increase or decrease in engine 102 power, a startup of the engine 102, and/or a shutdown of the engine 102. The level of the pilot fuel 112 in the accumulator is a factor of the amount of the pilot fuel 112 the engine 102 is using and the production rate of the pilot fuel 112 by the pilot fuel system 118. If the production rate of the pilot fuel 112 by the pilot fuel system 118 is greater than the use of the pilot fuel 112 by the engine 102, a level 142 of the pilot fuel 112 in the accumulator 114, detected by a level detector 144, will increase. Similarly, if the production rate of the pilot fuel 112 by the pilot fuel system 118 is less than the use of the pilot fuel 112 by the engine 102, the level 142 of the pilot fuel 112 in the accumulator 114, detected by the level detector 144, will decrease. To maintain the level 142 of the pilot fuel 112 in the accumulator 114 at a desired level (or operational range), a controller 146 is used.

The controller 146 has a function of maintaining the level 142 of the pilot fuel 112 in the accumulator above a certain level or within an operational range. For example, and not by way of limitation, a minimal level 142 may at least be sufficient pilot fuel 112 to provide for a complete shutdown and startup of the engine 102. As noted above, during a shutdown, the pilot fuel 112 may be used to help remove the primary fuel 104 from the engine 102 prior to shut down. Further, as noted above, the pilot fuel 112 may be used to provide a source of the pilot fuel 112 during a startup, giving the pilot fuel system 118 sufficient time to reach a desired operational temperature to begin producing the pilot fuel 112. The minimal level 142 may also be determined by a predetermined amount of pilot fuel 112 used when increasing power demand to a certain power increase or a certain rate (e.g., an instantaneous or relatively rapid increase in power demand). The predetermined amount may be based on a calculation of a volume of the pilot fuel 112 required during an increased demand until the pilot fuel system 118 increases the production of the pilot fuel 112 to meet the demand, as well as increase the level 142 of the pilot fuel 112 to make up for the extra pilot fuel 112 used as a result of the increased power demand.

Thus, if the controller 146 receives an input that the level 142 from the level detector 144 is at or below a low setpoint of a level in the accumulator 114, a pump control 148 of the controller 146 instructs the pilot fuel pump 122 to increase the flowrate of the pilot fuel pump 122. The increased flowrate of the pilot fuel pump 122 increases the production of the pilot fuel 112. The controller 146 may determine a rate of change of the level 142, whereby a detection of a rate of change above a high rate of change setpoint causes the pump control 148 of the controller 146 to increase the flowrate (or speed) of the pilot fuel pump 122 to a certain flowrate or increase the flowrate at a certain rate (i.e., quickly increase the speed) based on the rate of change of the level 142. The increased flowrate of the pilot fuel pilot 122 is designed to maintain at least a minimum level 142 in the accumulator 114. In a similar manner, if the controller 146 receives an input that the level 142 from the level detector 144 is at or above a high setpoint, the pump control 148 of the controller 146 instructs the pilot fuel pump 122 to decrease the flowrate of the pilot fuel pump 122. The decreased flowrate of the pilot fuel pump 122 decreases the production of the pilot fuel 112. The controller 146 may determine a rate of change of the level 142, whereby a higher rate of change causes the pump control 148 of the controller 146 to decrease the flowrate (or speed) of the pilot fuel pump 122 to a certain flowrate or decrease the flowrate at a certain rate (i.e., quicky decrease the speed) based on the rate of change of the level 142.

In some configurations, the controller 146 may use the increased power demand of the engine 102 to anticipate changes in the pilot fuel 112 use. In these examples, the controller 146 receives a power signal 150 from the engine 102 or some other system. The presently disclosed subject matter is not limited to the power signal 150 being received from or generated by the engine 102, as the power signal 150 may be generated by other components not shown in FIG. 1. The controller 146 receives the power signal 150 and adjusts the production of the pilot fuel 112 by the pilot fuel system 118 accordingly. For example, if the controller 146 receives the power signal 150 indicating that the engine 102 is to produce more power, the pump control 148 of the controller 146 instructs the pilot fuel pump 122 to increase the flowrate of the pilot fuel pump 122. In a similar manner, if the controller 146 receives the power signal 150 indicating that the engine 102 is to produce less power, the pump control 148 of the controller 146 instructs the pilot fuel pump 122 to decrease the flowrate of the pilot fuel pump 122. The controller 146 can still use the level 142 to make additional adjustments to the flowrate of the pilot fuel pump 122 to maintain the level 142 within an operational range.

The controller 146 can have additional functions other than maintaining the level 142 of the pilot fuel 112 in the accumulator 114 within an operational range. For example, the controller 146 can also control the flowrate of the waste pump 138. As noted above, the waste pump 138 is used to pump the liquified methanol/water stream 136 from the separator 130 into the primary fuel rail 110. However, if the flowrate of the waste pump 138 is greater than the production of the liquified methanol/water stream, the amount of the liquified methanol/water in the separator 130 may decrease to a level that causes the waste pump 138 to pump the produced pilot fuel 112 into the primary fuel rail 110 rather than just the liquified methanol/water. If the flowrate of the waste pump 138 is less than the production of the liquified methanol/water stream, the amount of the liquified methanol/water in the separator 130 may increase to a level that causes an overflow of the separator 130. Thus, the controller 146 pump control 148 increases or decreases the flowrate of the waste pump 138 to maintain a desired level of the liquified methanol/water in the separator 130.

The controller 146 is also used to control one or more valves that may be used in the system 100. For example, the controller 146 includes a valve control 152. The valve control 152 issues commands to various valves, such as the accumulator valve 154. In some examples, the accumulator valve 154 may be a gate valves that allows for the introduction of the produced pilot fuel 112 into the accumulator 114. However, in some examples, the system 100 may require that the accumulator 114 is fluidly disconnected from the pilot fuel system 118. To provide for fluidic disconnection, the valve control 152 instructs the accumulator valve 154 to close, disconnecting the accumulator 114 from the pilot fuel system 118. This allows the use of the separator 130 to reduce waste (in this example, unreacted methanol and water) from the system 100. The system 100 also can reduce waste by reusing heat. As mentioned above, the heat from the products 121 is transferred at least in part to the pumped primary fuel 104 from the primary fuel tank 106 using the recuperator 124. However, in some examples, the additional components needed for thermal recycling may not be needed or desired, illustrated by way of example in FIG. 2.

Figure 2:
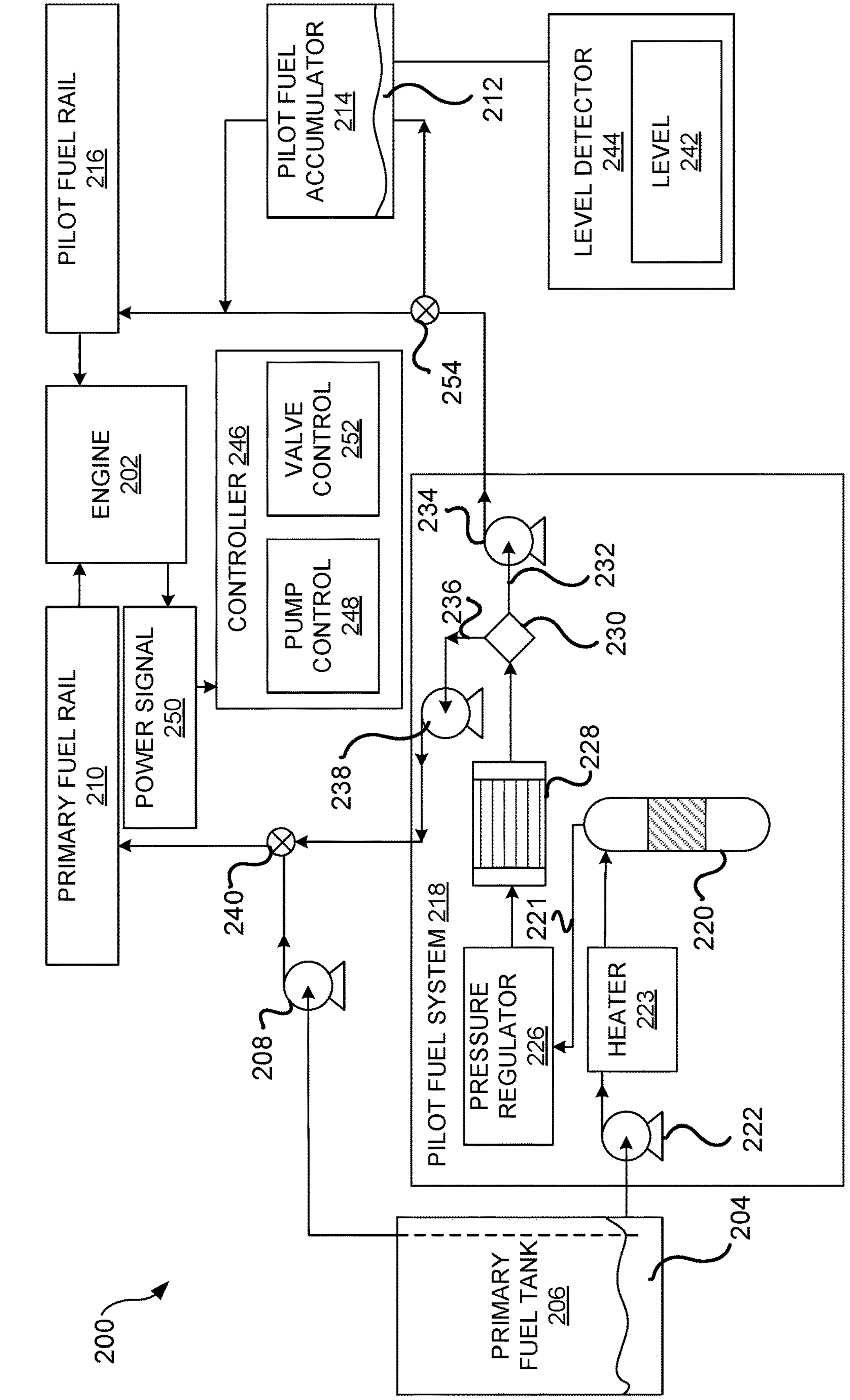
FIG. 2 is a schematic illustration of a system, including an internal combustion engine that creates pilot fuel from a primary fuel without thermal recovery, in accordance with one or more examples of the present disclosure.

FIG. 2 illustrates a system 200 in which thermal energy is not recycled or recuperated, according to various examples of the presently disclosed subject matter. In the system 100 of FIG. 1, the recuperator 124 provides for the recapture of the thermal energy generated during the reaction in the reactor 120. The system 200 of FIG. 2 does not include the thermal recapture. Other than the thermal recapture of FIG. 1, the system 200 of FIG. 2 operates in a similar manner to the system 100 of FIG. 1. Thus, for the purposes of brevity, some aspects of FIG. 2 are not described. In FIG. 2, the system 200 includes an engine 202. The engine 202 is an internal combustion engine fueled by a primary fuel 204 stored in a primary fuel tank 206. The primary fuel 204 may include an alcohol fuel such as methanol or ethanol, for example, or still other fuel types. For the purposes of illustrating an example of the presently disclosed subject matter, the primary fuel 204 is methanol. The primary fuel 204 is pumped by a primary fuel pump 208 into a primary fuel rail 210.

In some examples, the primary fuel 204 is a relatively lower cetane/higher octane type of fuel that in the configuration illustrated in FIG. 2 requires the use of a pilot fuel, such as the pilot fuel 212 stored in a pilot fuel accumulator 214 through a pilot fuel rail 216 to cause the ignition of the primary fuel 204. The pilot fuel 212 may include a higher cetane/lower octane liquid fuel, and the primary fuel 204 may include a lower cetane/higher octane liquid fuel. In the system 200 of FIG. 2, the pilot fuel 212 is produced from the primary fuel 204 using pilot fuel system 218. Thus, while the primary fuel tank 206 stores the primary fuel 204 for use by the engine 202, the primary fuel tank 206 also stores fuel to produce the pilot fuel 212 used by the engine 202. To produce the pilot fuel 212, in the example of FIG. 2, the primary fuel 204 undergoes a dehydration reaction in the reactor 220 according to the equation shown above with respect to FIG. 1.

Because the dehydration reaction provided above is an exothermic equilibrium equation, it follows that high degrees of conversion are achieved at reaction temperatures as low as possible. However, higher temperature, from a reaction-kinetic aspect, can increase reaction rates, and thus, DME conversion rates. To increase the temperature of the incoming primary fuel 104, a heater 223 may be used. However, if the temperature of the incoming primary fuel 204 is at a certain temperature (depending on the particular configuration of the system), the heater 223 may not need to be used.

Pilot fuel pump 222 pumps a portion of the primary fuel 204 into the pilot fuel system 218. The pilot fuel pump 222 pumps the primary fuel 104 through the heater 223 (if used) where the primary fuel 204 is reacted in the reactor 220 to form the pilot fuel 212, in this example DME. The output of the reactor 220 includes the pilot fuel 212, water, and unreacted primary fuel 204. The output of the reactor 220 enter a pressure regulator 226. The pressure regulator 226 lowers the pressure of the products 221 to liquify at least a portion of the methanol and water in the products 221. The products 221 thereafter enter condenser 228 to reduce the temperature (and in some examples, the pressure) of the products 221. It should be noted that in some examples, the methanol and water are liquified primary in, or exclusively in, the condenser 228. Thus, in these examples, the pressure regulator 226 may not be used or installed.

After the condenser 128, the products 221 are primarily methanol and water in liquid form and DME in gaseous form. The products 221 leave the condenser 228 and enter the separator 230. The gaseous DME 232 is pumped to the pilot fuel accumulator 214 using product pump 234. The product pump 234 increases the pressure of the DME to condense the vapor DME to liquid DME for storage within the accumulator 214. The methanol/water stream 236 is pumped into the primary fuel rail 210 using the waste pump 238 through a mixer 240. The mixer 240 provides for the introduction of the methanol/water stream 236 into the primary fuel 204 being pumped by the primary fuel pump 208 into the primary fuel rail 210.

The controller 246 maintains a level 242 of the pilot fuel 212 in the accumulator above a certain level or within an operational range. If the controller 246 receives an input that the level 242 from the level detector 244 is at or below a low setpoint, a pump control 248 of the controller 246 instructs the pilot fuel pump 222 to increase the flowrate of the pilot fuel pump 222. If the controller 246 receives an input that the level 242 from the level detector 244 is at or above a high level setpoint, the pump control 248 of the controller 246 instructs the pilot fuel pump 222 to decrease the flowrate of the pilot fuel pump 222. In some configurations, the controller 246 may use a power demand of the engine 102 to modify the pilot fuel 212 production. In these examples, the controller 246 receives a power signal 250 from the engine 102 or some other system. The controller 246 receives the power signal 250 and adjusts the production of the pilot fuel 212 by the pilot fuel system 218 accordingly. For example, if the controller 246 receives the power signal 250 indicating a request for the engine 202 to produce more power, the pump control 248 of the controller 246 instructs the pilot fuel pump 222 to increase the flowrate of the pilot fuel pump 222. In a similar manner, if the controller 246 receives the power signal 250 indicating a request for the engine 202 is to produce less power, the pump control 248 of the controller 246 instructs the pilot fuel pump 222 to decrease the flowrate of the pilot fuel pump 222. The controller 246 can still use the level 242 to make additional adjustments to the flowrate of the pilot fuel pump 222 to maintain the level 242 within an operational range.

Figure 3:
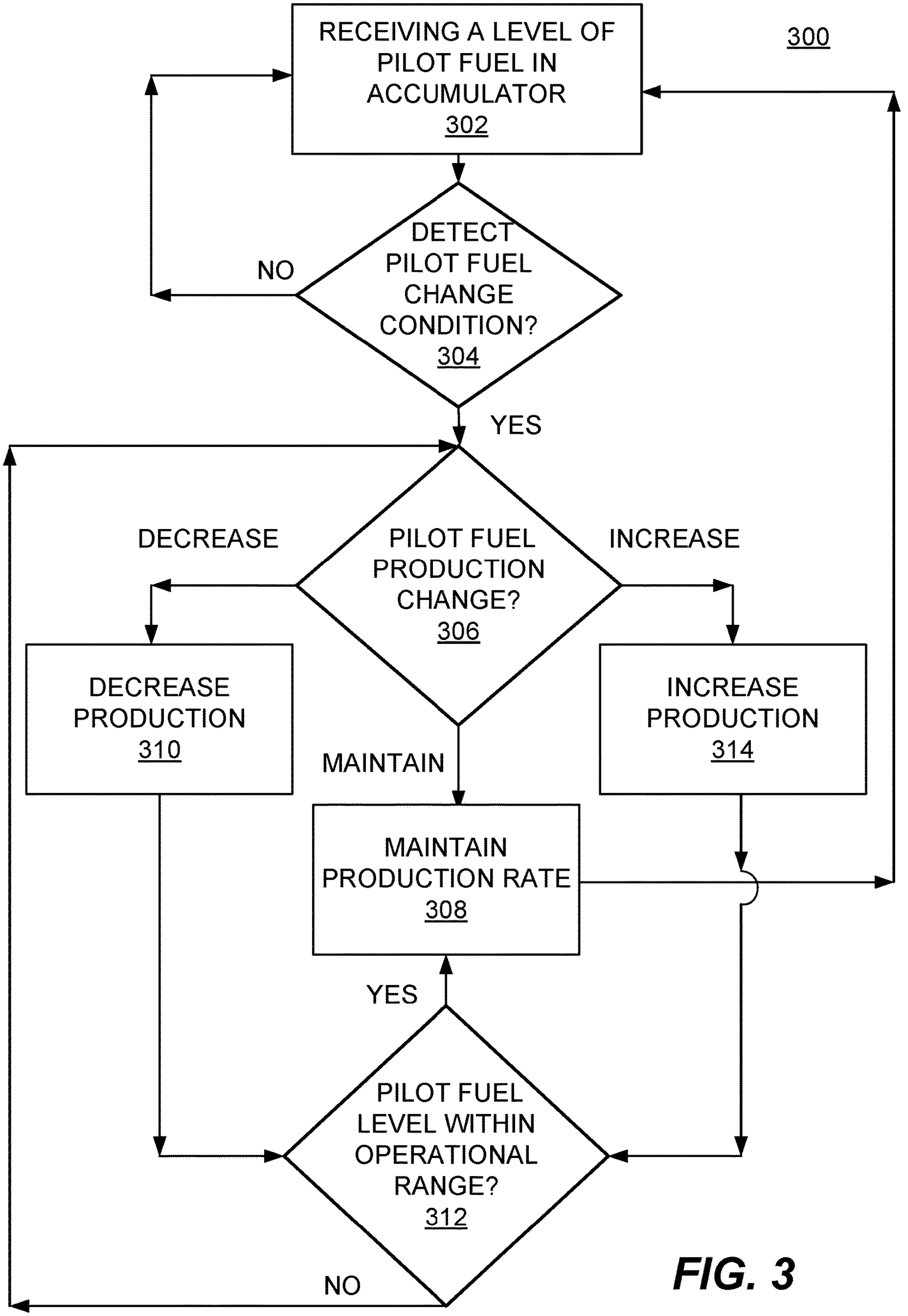
FIG. 3 illustrates a method for operating an internal combustion engine in which a controller maintains a level of a pilot fuel in an accumulator, in accordance with various examples of the presently disclosed subject matter.

The controller 246 can have additional functions other than maintaining the level 242 of the pilot fuel 212 in the accumulator 214 within an operational range. For example, the controller 246 can also control the flowrate of the waste pump 238. If the flowrate of the waste pump 238 is greater than the production of the liquified methanol/water stream, the amount of the liquified methanol/water in the separator 230 may decrease to a level that causes the waste pump 238 to pump the produced pilot fuel 212 into the primary fuel rail 210 rather than just the liquified methanol/water. If the flowrate of the waste pump 238 is less than the production of the liquified methanol/water stream, the amount of the liquified methanol/water in the separator 230 may increase to a level that causes an overflow of the separator 230. Thus, the controller 246 pump control 248 increases or decreases the flowrate of the waste pump 238 to maintain a desired level of the liquified methanol/water in the separator 230. The controller 246 is also used to control one or more valves that may be used in the system 200. For example, the controller 246 includes a valve control 252. The valve control 252 issues commands to various valves, such as the accumulator valve 254. FIG. 3 illustrates a method for which the controller, such as the controller 146 or the controller 246, may be operated to maintain pilot fuel levels in their respective systems.

FIG. 3 illustrates a method 300 for operating the internal combustion engine 102 in which the controller 146 maintains the level 142 of the pilot fuel 112 in the accumulator 114, in accordance with various examples of the presently disclosed subject matter. The method 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 300 commences at step 302, where the controller 146 is receiving the level 142 of the pilot fuel 112 in the accumulator 114. The level 142 of the pilot fuel 112 in the accumulator 114 can be used to allow for transient events such as, but not limited to, an increase or decrease in engine 102 power, a startup of the engine 102, and/or a shutdown of the engine 102. During use, the accumulator 114 acts as a buffer or "make-up" tank that allows for a consistent flow of the pilot fuel 112 into the pilot fuel rail 116. The pilot fuel system 118 may not be capable of an instant or rapid increase or decrease of production of the pilot fuel 112. Further, while starting up, the pilot fuel system 118 may be at reduced temperature whereby the efficiency of the reaction within the reactor 120 is insufficient to produce the pilot fuel 112. Thus, the pilot fuel 112 stored in the accumulator 114 prior to shutdown of the engine 102 can be used while the pilot fuel system 118 increases to a desired operational temperature. Further, the pilot fuel 112 in the accumulator 114 may be used during a shutdown of the engine 102 to assist in the purge of the primary fuel 104 from the engine 102. The level 142 can be maintained within an operational range from a low setpoint indicating a low level to a high setpoint indicating a high level.

The method 300 continues to step 304, where the controller 146 determines if a condition has been detected that requires a change in production rate of the pilot fuel 112. A condition can include, but is not limited to, the level 142 reaching a low setpoint or a high setpoint, a shutdown of the engine, or a change in power required of the engine 102 as indicated by the power signal 150. If a condition is not received, the method continues to step 302, where the controller 146 continues to receive levels of pilot fuel in the accumulator.

If a condition requiring a change in the production of the pilot fuel 112 is detected at step 304, the method 300 continues to step 306, where the controller 146 determines if the pilot fuel 112 production rate is to be increased, decreased, or maintained. The determination of whether or not the pilot fuel 112 production rate is to be determined is, in some examples, based on whether the condition indicates that the level in the accumulator is changing or is expected to change to a level above or below a determined level setpoint. For example, the condition can be an increase in power required of the engine 102. This indicates that an increased amount of the pilot fuel 112 production may be needed in order to maintain a level of the pilot fuel 112 in the accumulator above a low setpoint in the accumulator. Similarly, the condition can be a decrease in power required of the engine 102. This indicates that a decreased amount of the pilot fuel 112 production may be needed in order to maintain a level of the pilot fuel 112 in the accumulator below a high setpoint.

If, at step 306, the controller determines that the production rate of the pilot fuel 112 is to be maintained at a current rate, the method 300 continues to step 308, where the controller 146 does not cause a change in pump speeds or make other changes to the configuration of the system 100. The method 300 continues to step 302, where the controller 146 continues to receive the level 142 of the pilot fuel 112 in the accumulator 114.

If the controller 146 at step 306 determines that a decrease in the rate of pilot fuel 112 production is required in order to maintain a level of the pilot fuel in the accumulator below a high setpoint, the method 300 continues to step 310, where the controller 146 decreases the rate of production of the pilot fuel 112. The pump control 148 of the controller 146 instructs the pilot fuel pump 122 to decrease the flowrate of the pilot fuel pump 122 so that the level of the pilot fuel 112 in the accumulator is maintained at or near a level, in some examples, the level detected at step 302 prior to detecting the condition at step 304. The decreased flowrate of the pilot fuel pump 122 decreases the production of the pilot fuel 112.

The method 300 continues to step 312, where the controller 146 determines if the level 142 of the pilot fuel 112 is within an operational range. If at step 314 the controller 146 determines that the level 142 is within the operational range, the method 300 continues to step 308 and maintains the rate of production of the pilot fuel 112. If at step 314 the controller 146 determines that the level 142 of the pilot fuel 112 is not within the operational range, the method continues to step 306, where the controller 146 determines if the rate of production of the pilot fuel 112 is to be increased, decreased, or maintained.

If at step 306 the controller 146 determines that the rate of production of the pilot fuel 112 is to be increased, the method 300 continues to step 314, where the controller 146 increases the rate of production of the pilot fuel 112 so that the level of the pilot fuel 112 in the accumulator is maintained at or near a level, in some examples, the level detected at step 302 prior to detecting the condition at step 304. A pump control 148 of the controller 146 instructs the pilot fuel pump 122 to increase the flowrate of the pilot fuel pump 122. The increased flowrate of the pilot fuel pump 122 increases the production of the pilot fuel 112. The controller 146 may determine a rate of change of the level 142, whereby a higher rate of change causes the pump control 148 of the controller 146 to increase the flowrate (or speed) of the pilot fuel pump 122 to a certain flowrate or increase the flowrate at a certain rate (i.e., quickly increase the speed) based on the rate of change of the level 142.

The method 300 continues to step 312, where the controller 146 determines if the level 142 of the pilot fuel 112 is within an operational range. If at step 314 the controller 146 determines that the level 142 is within the operational range, the method 300 continues to step 308 and maintains the rate of production of the pilot fuel 112. If at step 314 the controller 146 determines that the level 142 of the pilot fuel 112 is not within the operational range, the method continues to step 306, where the controller 146 determines if the rate of production of the pilot fuel 112 is to be increased, decreased, or maintained.

Figure 4:
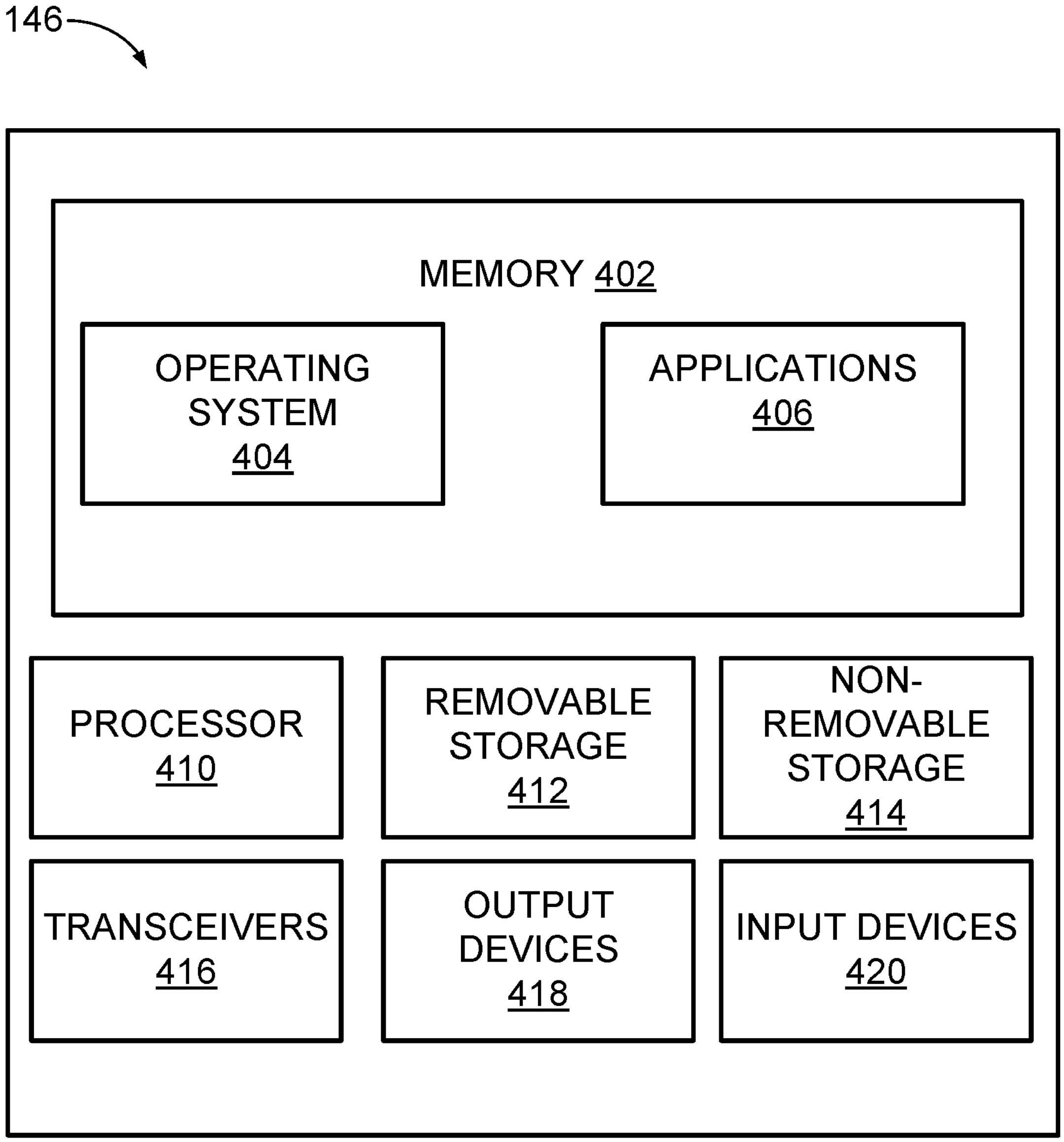
FIG. 4 depicts a component level view of a controller for use with the systems and methods described herein, in accordance with various examples of the presently disclosed subject matter.

FIG. 4 depicts a component level view of the controller 146 for use with the systems and methods described herein, in accordance with various examples of the presently disclosed subject matter. The controller 146 could be any device capable of providing the functionality associated with the systems and methods described herein. The controller 146 can comprise several components to execute the above-mentioned functions. The controller 146 may be comprised of hardware, software, or various combinations thereof. As discussed below, the controller 146 can comprise memory 402 including an operating system (OS) 404 and one or more standard applications 406. The standard applications 406 may include applications that provide for the pump control 148 or the valve control 152, as well as, receiving and storing signals such as the power signal 150 and the level 142.

The controller 146 can also comprise one or more processors 410 and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two. The memory 402 can include data pertaining to signals such as the power signal 150 and the level 142, and other information, and can be stored on a remote server or a cloud of servers accessible by the controller 146.

The memory 402 can also include the OS 404. The OS 404 varies depending on the manufacturer of the controller 146. The OS 404 contains the modules and software that support basic functions of the controller 146, such as scheduling tasks, executing applications, and controlling peripherals. The OS 404 can also enable the controller 146 to send and retrieve other data and perform other functions, such as the power signal 150 and the level 142, as well as, instructions from the pump control 148 or the valve control 152.

The controller 146 can also comprise one or more processors 410. In some implementations, the processor(s) 410 can be one or more central processing units (CPUs), graphics processing units (GPUs), both CPU and GPU, or any other combinations and numbers of processing units. The controller 146 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 146. Any such non-transitory computer-readable media may be part of the controller 146 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the controller 146 and one or more pumps or valves), the Internet, and/or an intranet. Specifically, the transceiver(s) 416 can include one or more transceivers that can enable the controller 146 to send and receive data. Thus, the transceiver(s) 416 can include multiple single-channel transceivers or a multi-frequency, multi-channel transceiver to enable the controller 146 to send and receive video calls, audio calls, messaging, etc. The transceiver(s) 416 can enable the controller 146 to connect to multiple networks including, but not limited to 2G, 3G, 4G, 5G, and Wi-Fi networks. The transceiver(s) 416 can also include one or more transceivers to enable the controller 146 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver(s) 416 can enable the controller 146 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

INDUSTRIAL APPLICABILITY

The present disclosure relates generally to internal combustion engines that use a pilot fuel to assist with the ignition of a primary fuel. The systems 100 and 200 illustrated in FIGS. 1 and 2, respectively, use the primary fuel 104 as the source for the pilot fuel 112. The primary fuel 104 undergoes a dehydration reaction to produce the pilot fuel 112. The use of the primary fuel as the fuel source for the production of the pilot fuel allows the use of a single storage system, i.e., the primary fuel tank 106, to be the source for both of the fuels in a dual fuel system. This can help to reduce the number of components required to operate the engine 102. This may be beneficial in uses in which space may be limited (e.g., a work machine) or where a reduction in components for cost or safety is desirable.

The systems described herein use the accumulator 114 to act as a buffered source of the pilot fuel 112 during transient conditions such as an increase or decrease in power. Further, the accumulator 114 can be used as a source of pilot fuel 112 during a startup condition. The controller 146 can adjust the production rate of the pilot fuel 112 by the pilot fuel system 118 to maintain the level 142 of the pilot fuel 112 in the accumulator 114 within an operational range. Using the accumulator 114 in this manner can reduce the rate of change of production required of the pilot fuel system 118. This reduced rate of change of production can reduce the thermal stresses placed on the pilot fuel system 118, potentially increasing the longevity of the pilot fuel system 118 and reducing a failure rate of the systems overall.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:

an internal combustion engine that consumes a primary fuel and a pilot fuel;

a primary fuel tank providing the primary fuel to a primary fuel rail for use by the internal combustion engine;

a pilot fuel system configured to generate the pilot fuel from the primary fuel, the pilot fuel system including:

a pilot fuel pump fluidically connected to the primary fuel tank, the pilot fuel pump configured to pump the primary fuel from the primary fuel tank to a reactor of the pilot fuel system;

the reactor that receives the primary fuel from the pilot fuel pump, the reactor configured to convert the primary fuel received from the pilot fuel pump from an alcohol to an ether, wherein a product of the reactor comprises the pilot fuel, unreacted primary fuel, and water;

a condenser that receives the product of the reactor, the condenser configured to condense the unreacted primary fuel and the water in the product received from the reactor into liquified unreacted primary fuel and water;

a separator that receives the liquified unreacted primary fuel and water and pilot fuel, the separator configured to separate the pilot fuel from the liquified unreacted primary fuel and water;

a waste pump that receives the liquified unreacted primary fuel and water from the separator, the waste pump configured to pump the liquified unreacted primary fuel and water to the primary fuel rail;

a product pump that receives the pilot fuel from the separator, the product pump configured to pump the pilot fuel converted from the primary fuel to an accumulator for use by the internal combustion engine; and a controller to maintain a level of the pilot fuel stored in the accumulator within an operational range by changing a speed of the pilot fuel pump based on the level of the pilot fuel stored in the accumulator.

2. The system of claim 1, wherein the controller reduces the rate of production of the pilot fuel by transmitting a first pump control signal to reduce the speed of the pilot fuel pump from a first pump rate to a second pump rate, wherein the second pump rate is lower than the first pump rate.

3. The system of claim 2, wherein the controller increases the rate of production of the pilot fuel by transmitting a second pump control signal to increase the speed of the pilot fuel pump from the first pump rate to a third pump rate, wherein the third pump rate is higher than the first pump rate.

4. The system of claim 1, wherein the primary fuel comprises methanol and the pilot fuel comprises dimethyl ether.

5. The system of claim 1, further comprising a pilot fuel rail in fluidic communication with the accumulator, the pilot fuel rail configured to receive the pilot fuel from the accumulator and direct the pilot fuel into the internal combustion engine.

6. The system of claim 1, wherein the controller is further configured to transmit a valve control signal to close an accumulator valve to fluidically disconnect the pilot fuel system from the accumulator.

7. The system of claim 1, further comprising a recuperator that receives the product of the reactor to transfer heat of the product of the reactor to the primary fuel pumped into the pilot fuel system.

8. The system of claim 7, further comprising a pressure regulator that receives the product from the recuperator, the pressure regulator configured to reduce a pressure of the product of the reactor to cause at least a portion of the product of the reactor to condense to a liquid.

9. The system of claim 7, further comprising a heater that receives the primary fuel from the recuperator, the heater configured to heat the primary fuel pumped into the pilot fuel system to an operational temperature of the reactor.

10. A method of operating an internal combustion engine, comprising:

receiving, by a controller, a level of a pilot fuel in an accumulator, wherein the pilot fuel consumed by the internal combustion engine is generated by a conversion of a primary fuel consumed by the internal combustion engine into the pilot fuel using a dehydration reaction in a reactor;

detecting, by the controller, at least one condition in which a change in a production rate of the pilot fuel by a pilot fuel system is required, wherein a first condition of the at least one condition comprises a level of pilot fuel stored in the accumulator;

determining, by the controller based on detecting the at least one condition, that the production rate of the pilot fuel is to be:

reduced by transmitting a first pump control signal to reduce a speed of a pilot fuel pump from a first pump rate to a second pump rate, wherein the second pump rate is lower than the first pump rate, wherein the pilot fuel pump is fluidically connected to a primary fuel tank storing the primary fuel, the pilot fuel pump configured to pump the primary fuel from the primary fuel tank to the reactor;

increased by transmitting a second pump control signal to increase the speed of the pilot fuel pump from the first pump rate to a third pump rate, wherein the third pump rate is higher than the first pump rate; or maintained at the first pump rate.

11. The method of claim 10, wherein the primary fuel comprises methanol and the pilot fuel comprises dimethyl ether.

12. The method of claim 10, further closing an accumulator valve to fluidically disconnect the pilot fuel system from the accumulator.

13. The method of claim 10, further comprising recapturing heat of the product of the reactor by transferring the heat of the product in a recuperator to the primary fuel pumped into the pilot fuel system.

14. The method of claim 10, further comprising:

pumping the pilot fuel into a pilot fuel rail for consumption by the internal combustion engine; and pumping the primary fuel into a primary fuel rail for consumption by the internal combustion engine.

15. The method of claim 10, further comprising reducing a pressure of the product of the reactor in a pressure regulator to cause at least a portion of the product of the reactor to condense to a liquid.

16. The method of claim 10, further comprising heating the primary fuel pumped into the pilot fuel system in a heater to an operational temperature of the reactor.

17. The method of claim 10, further comprising providing a power signal as an input to the controller as a second condition of the at least one condition in which a change in a production rate of the pilot fuel by a pilot fuel system is required.

18. A pilot fuel system configured to generate a pilot fuel from a primary fuel, the pilot fuel system comprising:

a pilot fuel pump fluidically connected to the primary fuel tank, the pilot fuel pump configured to pump the primary fuel from the primary fuel tank to a reactor of the pilot fuel system;

the reactor that receives the primary fuel from the pilot fuel pump, the reactor configured to convert the primary fuel received from the pilot fuel pump from an alcohol to an ether, wherein a product of the reactor comprises the pilot fuel, unreacted primary fuel, and water;

a condenser that receives the product of the reactor, the condenser configured to condense the unreacted primary fuel and the water in the product received from the reactor into liquified unreacted primary fuel and water;

a separator that receives the liquified unreacted primary fuel and water and pilot fuel, the separator configured to separate the pilot fuel from the liquified unreacted primary fuel and water;

a waste pump that receives the liquified unreacted primary fuel and water from the separator, the waste pump configured to pump the liquified unreacted primary fuel and water to the primary fuel rail;

a product pump that receives the pilot fuel from the separator, the product pump configured to pump the pilot fuel converted from the primary fuel to an accumulator for use by an internal combustion engine; and a controller to maintain a level of the pilot fuel stored in the accumulator within an operational range by changing a speed of the pilot fuel pump to change a rate of production of the pilot fuel based on the level of the pilot fuel stored in the accumulator.

19. The pilot fuel system of claim 18, wherein the controller is configured to reduce the rate of production of the pilot fuel by transmitting a first pump control signal to reduce the speed of the pilot fuel pump from a first pump rate to a second pump rate, wherein the second pump rate is lower than the first pump rate.

20. The pilot fuel system of claim 19, wherein the controller is configured to increase the rate of production of the pilot fuel by transmitting a second pump control signal to increase the speed of the pilot fuel pump from the first pump rate to a third pump rate, wherein the third pump rate is higher than the first pump rate.

* * * * *